United States Patent [19]

Moriguchi

[11] 4,079,745
[45] Mar. 21, 1978

[54] VALVES FOR REGULATING FLOW RATE

[75] Inventor: Kunikatsu Moriguchi, Joyo, Japan

[73] Assignees: Kabushiki Kaisha Takada Seisakusho, Kyoto; Narita Kogyo Kabushiki Kaisha, Seto, both of Japan

[21] Appl. No.: 687,196

[22] Filed: May 17, 1976

[30] Foreign Application Priority Data

May 19, 1975 Japan .................................. 50-60021
May 19, 1975 Japan .................................. 50-60022

[51] Int. Cl.² .......................... F16K 47/04; F16K 5/10
[52] U.S. Cl. ..................................... 137/270; 251/207; 251/209
[58] Field of Search ................ 251/207, 209; 137/269, 137/270

[56] References Cited

U.S. PATENT DOCUMENTS

| | | | |
|---|---|---|---|
| 2,140,292 | 12/1938 | Jensen | 251/209 |
| 2,554,040 | 5/1951 | Long | 251/209 |
| 3,700,003 | 10/1972 | Smith | 251/207 X |

FOREIGN PATENT DOCUMENTS 2,531,809 1/1976 Germany .............................. 251/207

*Primary Examiner*—Arnold Rosenthal
*Attorney, Agent, or Firm*—Edwin E. Greigg

[57] ABSTRACT

A valve embodying combustion techniques for burners, especially the control technique for maintaining the fuel-to-air ratio at an optimum value over the entire range of low combustion to high combustion which ratio has close relation to nitrogen oxide emissions causing air pollution, to the consumption of fuel gas and to the safety and stability of combustion per se. The valve is installed mainly in the gas feed channel for a burner to freely regulate the rate of flow of gas to the burner accurately in conformity with the flow rate characteristics of air and to thereby provide an optimum fuel-to-air ratio. The valve is very useful in reducing nitrogen oxide emissions, saving energy and ensuring safety.

5 Claims, 13 Drawing Figures

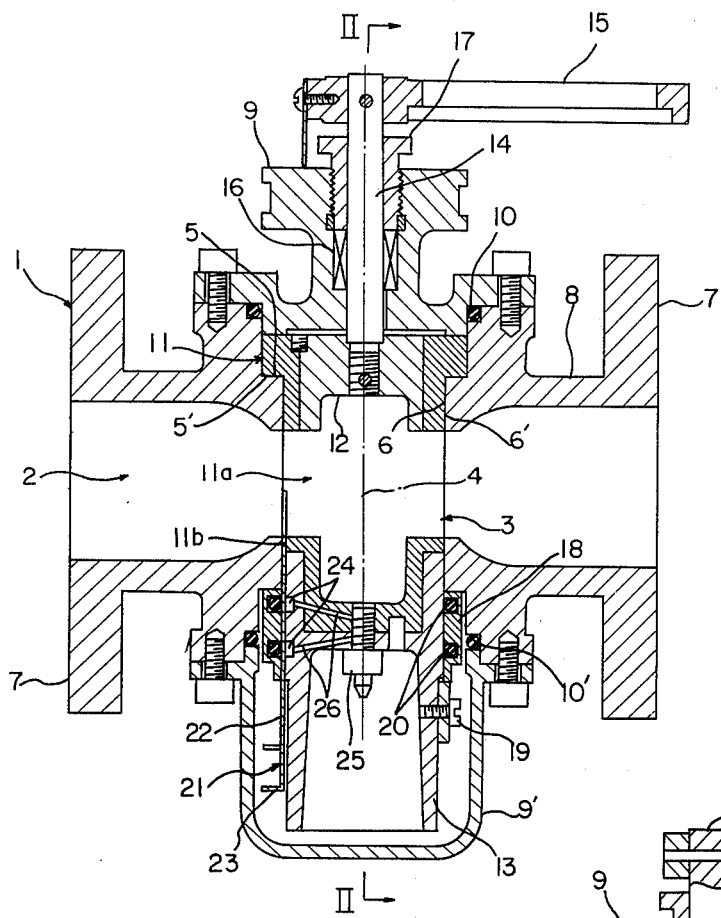
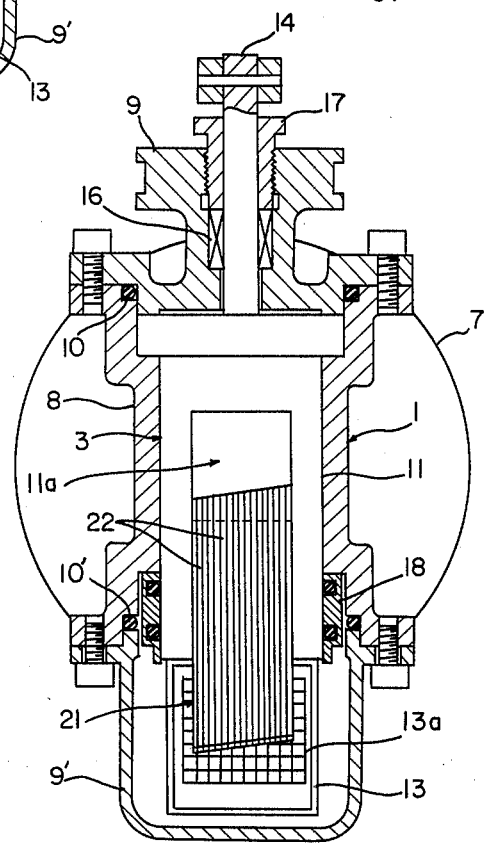
Fig. 1
Fig. 2

(a)

(b)

(c)

(d)

VALVES FOR REGULATING FLOW RATE

BACKGROUND OF THE INVENTION

The present invention relates to valves to be installed for example in the fuel gas feed channel for a burner to regulate the rate of flow of fuel gas into the burner and to thereby properly maintain the fuel-to-air ratio during combustion. More particularly, the invention relates to a flow rate regulating valve comprising a valve casing disposed substantially at right angles to a fluid channel, a valve member movably fitted in the valve casing and a manipulating portion for moving the movable valve member from outside the valve casing so that the degree of opening of the fluid channel can be adjusted to regulate the flow rate by moving the valve member.

Observation of combustion of gas indicates that unless a proper fuel-to-air ratio is maintained, the fuel-air mixture is likely to be outside the explosion limits, favoring inadvertent extinction of fire in the burner and possibly leading to a hazardous situation that the furnace is filled with a raw gas. Use of natural gas as the fuel involves a still greater hazard, because the gas has narrow explosion limits. In contrast, when the fuel-to-air ratio is maintained properly throughout the entire range of low combustion to high combustion, complete combustion will result which serves to inhibit nitrogen oxide emissions, a cause of air pollution, and also to achieve improved combustion efficiency for economical use of energy.

Accordingly, flow rate regulating valves for controlling combustion must have such flow rate characteristics that when the amount of combustion is altered, the fuel gas supply can be regulated in conformity with a change in the combustion air supply required by the altered amount of combustion so as to maintain a proper fuel-to-air ratio.

Supposedly, valves of varying flow rate characteristics adapted for varying types of burners and fuels may be prepared so that an appropriate valve can be used selectively for the particular burner and fuel desired, but the manufacturing cost will then be prohibitive. Further it is possible to replace the flow rate regulating valve to provide different flow rate characteristics when the burner or fuel is changed, but this is very inconvenient and uneconomical for practical use. It is therefore required that the valve for regulating the flow rate of gas be freely variable as desired in its flow rate characteristics.

In order to fulfil the foregoing requirements, a gas flow rate regulating valve has already been provided which includes a third member for altering the opening area of the flow channel to give variable flow rate characteristics. However, because the regulating valve is so adapted that the area of opening of the flow channel is altered at a linearly (i.e. linear functionally) variable change rate, the flow rate characteristics thereof, although variable, are limited to a narrow range of alterations. In other words, the desired flow rate characteristics are not always available.

Another type of gas flow rate regulating valve including such third member is also known which further incorporates cam means for moving the third member in operative relation to the movement of a movable valve member, such that the rate of variation in the opening area of the fluid channel is altered relative to the opening of the flow channel as adjusted by the movement of the movable valve member. The flow rate characteristics of this valve are freely variable, since the area of opening can be altered by the movement of the movable valve member and also by the movement of the third member. However, the cam means incorporated makes the valve complex in construction and costly to manufacture. When worn away during use, moreover, the cam means produces a play in the movement of the third member and needs replacement to maintain the desired controlling function over a prolonged period of time. The valve therefore requires a high running cost. Furthermore, the flow rate characteristics to be determined by adjusting the cam means are not settable with high precision.

SUMMARY OF THE INVENTION

The present invention has overcome the foregoing drawbacks and provides a flow rate regulating valve which is simple in construction, inexpensive to make and settable for the desired flow rate characteristics with high precision.

The flow rate regulating valve of this invention comprises a valve casing disposed substantially at right angles to a fluid channel, a valve member movably fitted in the valve casing and a manipulating portion for moving the movable valve member from outside the valve casing to adjust the degree of opening of the fluid channel by moving the movable valve member, the valve further comprising a third member for altering the rate of variation in the opening area of the fluid channel relative to the degree of opening of the fluid channel adjusted by the movement of the movable valve member, so that the flow rate characteristics of the valve are settable by altering the rate of variation in the opening area of the fluid channel relative to the opening degree thereof by the third member.

More specifically, the area and shape of the portion of the third member projecting into the fluid channel alter the rate of change in the area of opening of the fluid channel relative to the degree of opening of the channel adjusted by the movement of the movable valve member. Accordingly the third member need not be moved in operative relation to the movement of the movable valve member unlike the conventional valve already described, and the cam means can be dispensed with. This simplifies the construction and reduces the initial cost. Because the third member is fixedly mountable on the valve casing or valve member, the flow rate characteristics are settable with improved precision, while the valve is usable at a reduced running cost.

An object of this invention is to provide a flow rate regulating valve which is simple in construction, inexpensive to make and settable for the desired flow rate characteristics with high precision and which is therefore useful in controlling the fuel-to-air ratio, in inhibiting nitrogen oxide emissions and in saving energy.

Another object of this invention is to provide a valve which is settable for the desired flow rate characteristics with greatly improved precision, simply with use of one third member.

Another object of this invention is to provide a valve which has improved gas- and water-tightness although adapted for the desired flow rate characteristics with high precision.

Still another object of this invention is to provide a valve including a third member which greatly facilitates flow rate characteristics setting and which permits the operator to very readily ascertain the flow rate characteristics thereby determined.

Other objects and benefits of this invention will become apparent form the following description.

BRIEF DESCRIPTION OF THE DRAWINGS

FIG. 1 is a side elevation in vertical section showing a flow rate regulating valve according to this invention;

FIG. 2 is a front view in vertical section taken along the line II—II in FIG. 1;

DESCRIPTION OF THE PREFERRED EMBODIMENTS

Figure 3:
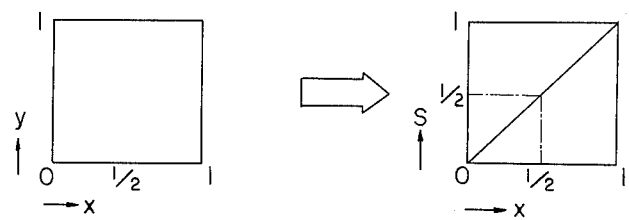
FIGS. 3(a) to 3(d) and FIG. 5 are diagrams showing various shapes of port of the flow rate regulating valve and the relation between the opening degree of the valve having the varying shapes of port and the area of opening thereof.
Figure 3:
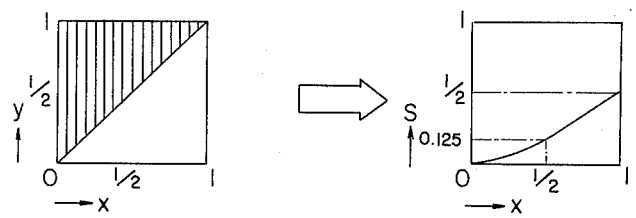
Figure 3:
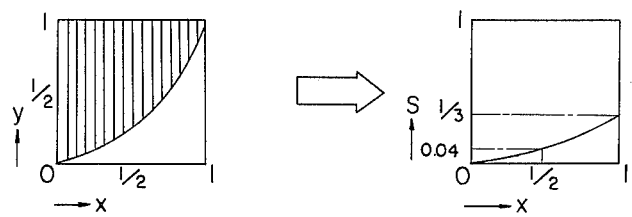
Figure 3:
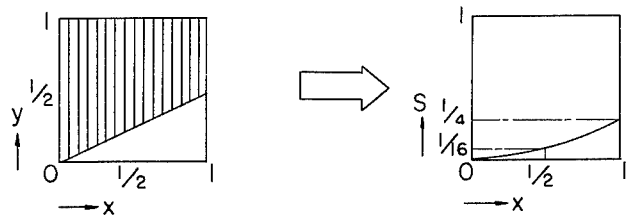

This invention will be described below with reference to the preferred embodiments. FIGS. 1 and 2 show a valve casing 1 provided at right angles to a flow channel 2. A valve member 3 is fitted in a bore extending through the valve casing 1 and is supported by the casing rotatably only about an axis 4 perpendicular to the flow channel 2. The valve casing 1 and the valve member 3 have thrust surfaces 5 and 5' in contact with each other to prevent movement of these two members 1 and 3 in the direction of axis 4 relative to each other and are further formed with rotation surfaces 6 and 6' permitting them to rotate about the axis 4 relative to and in contact with each other. The valve casing 1 comprises a main body 8 and upper and lower covers 9 and 9' closing the openings of the above-mentioned bore. The main body 8 is internally formed with the fluid channel 2 and the bore and has flanges 7 and 7 for connection to a fluid conduit. Hermetically sealing O-rings 10 and 10' are provided between the casing main body 8 and the covers 9 and 9'. The valve member 3 comprises a valve member main body 11 having a valve port 11a of square cross section and turnable about the axis 4 to open or close the fluid channel 2 within the casing 1; a top portion 12 fixedly connected to the upper end of the main body 11; and a tubular needle rack 13 fixedly connected to the lower end of the main body 11. An arm shaft 14 for turning the valve member 3 extends through the upper cover 9 rotatably about the axis 4 and has a lower end connected to the top portion 12 and an upper end outwardly projecting from the upper cover 9 and connected to an arm 15. A packing 16 is provided between the arm shaft 14 and the upper cover 9 fitting around the shaft 14. A packing holder 17 for preventing removal of the packing 16 is screwed into the cover 9. Fitting around the needle rack 13 are a tight ring 18 axially bearing against the casing main body 8 in hermetic contact therewith and a fastening member 19 for holding the tight ring 18 in contact with the casing main body 8 against axial displacement. O-rings 20 and 20 are provided between the tight ring 18 and the needle rack 13. A third member 21 is mounted on the needle rack 13 by being held thereagainst by the tight ring 18 movably in the direction of axis 4. A circular arc cutout 11b formed in the outer periphery of the valve member main body 11 prevents the third member 21 from moving about the axis 4 relative to the needle rack 13. The third member 21 comprises a plurality of needles 22 of an equal length arranged side by side in the direction of rotation of the valve member 3 and in intimate contact with each other. The needles 22 are each individually movable in the direction of axis 4. The portion of the third member 21 projecting over the valve port 11a is variable in area and shape by moving the needles 22 individually in the direction of axis 4, whereby the area and shape of the opening of the valve port 11a can be altered. The ends of the needles 22 positioned opposite to the valve port 11a are bent upward to provide manipulating portions 23 for axially moving the needles 22. The lower cover 9' is removed from the casing main body 8 when moving the needles 22. Two circular arc oil seal spaces 24 and 24 spaced apart in the direction of axis 4 are formed in the outer peripheral surface of the needle rack 13 in opposed relation to the tight ring 18 as well as to the needles 22. The oil seal spaces seal the clearance between the needle rack 13 and the needles 22 and the clearances between the needles 22. A grease nipple 25 communicating with the oil seal spaces 24 and 24 by way of passages 26 and 26 is mounted on the valve member 3 at such position that grease can be supplied to the nipple when the lower cover 9' is removed. An indicator plate 13a is attached to the needle rack 13 so that the position of the manipulating bent portion 23 of each of the needles 22 with respect to the direction of axis 4 relative to the needle rack 13 provides indication of the amount of projection of the needle 22 over the valve port 11a.

Suppose the width of the valve port 11a in the direction of rotation (namely degree of opening) is $x$, the width of the valve port 11a in the direction of axis 4 is $y$, the area of opening of valve port 11a is S, the maximum value of $x$ is 1 and that of $y$ is also 1. When the ends of the needles 22 are projected over the valve port 11a as aligned along the straight line of $y=a$ ($a$ is constant), the relation between the opening area S and the opening degree $x$ is $S=x$ as illustrated in FIG. 3(a). When the ends of the needles 22 are projected over the valve port 11a as positioned along the straight line of $y=x$, the relation between the opening area S and the opening degree $x$ is $S=\frac{1}{2}x^2$ as shown in FIG. 3(b). When the ends of the needles 22 are projected over the valve port 11a as positioned along the curve of $y=x^2$ as shown in FIG. 3(c), the relation between the opening area S and the opening degree $x$ is $S=\frac{1}{3}x^3$. When the ends of the needles 22 are projected over the valve port 11a as positioned along the straight line of $y=\frac{1}{2}x$ as shown in FIG. 3(d), the relation between the opening area S and the opening degree $x$ is $S=\frac{1}{4}x^2$.

Figure 4:
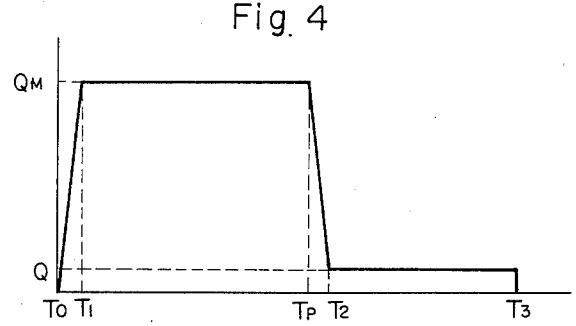
FIG. 4 is a diagram showing a mode of flow rate control for a furnace.

FIG. 4 is a diagram showing variations of flow rate in a furnace with the lapse of time, in which $T_0$ is ignition time, $T_1$ is the time when the valve is fully opened, $T_p$ is the time when heat-up has been completed, $T_2$ is the time when the valve opening is constricted to a degree required for giving a constant amount of heat, $T_3$ is the time when the fire is extinguished, QM is the flow rate of gas during the heat-up and Q is the flow rate of gas while giving the constant amount of heat.

Figure 5:
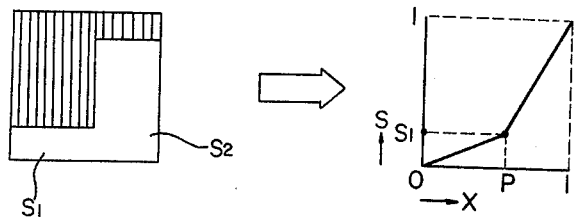

FIG. 5 shows a shape of valve port 11a of the flow rate regulating valve of this invention employed for the furnace and the relation between the opening degree $x$ of the port having the illustrated shape and the opening area S thereof. More specifically, the ends of the needles 22 positioned over a port width of 0 to P are aligned along the line of $y=c$ ($c$ is a constant) so that the opening area $S_1$ within the range of opening degrees of 0 to P will be $S_1 = bx$ ($b$ is a constant). The ends of the needles 22 positioned over a port width of P to 10 are aligned along the line of $y=c'$ ($c'$ is a constant) so that the opening area $S_2$ within the range of opening degrees of P to 10 (full open) will be $S_2 = b'x + d$ ($b'$ and $d$ are constants).

Figure 6:
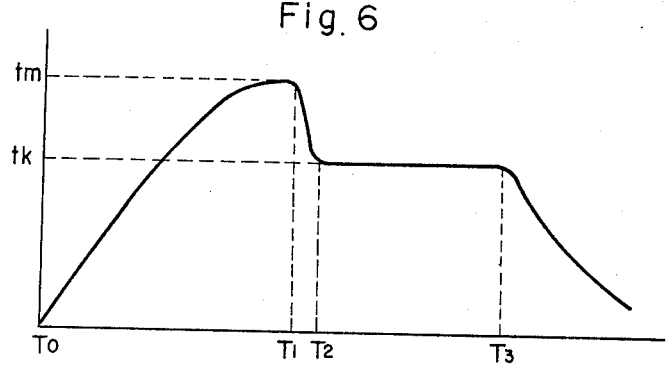
FIG. 6 is a diagram showing a heat pattern involved in the operation of the furnace based on the diagram of FIG. 4 and using a valve having a port of the shape shown in FIG. 5.
Figure 7:
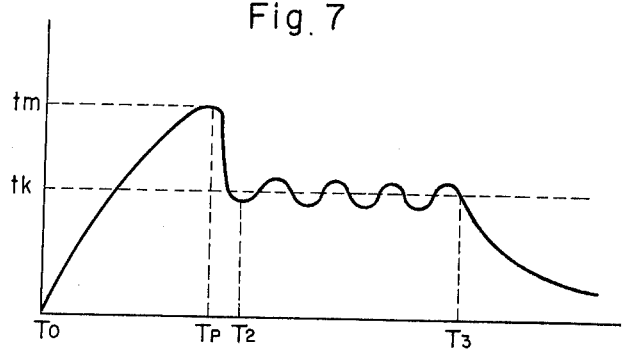
FIG. 7 is a diagram showing a heat pattern involved in the operation of the furnace based on the diagram of FIG. 4 and using a conventional valve of larger size.
Figure 8:
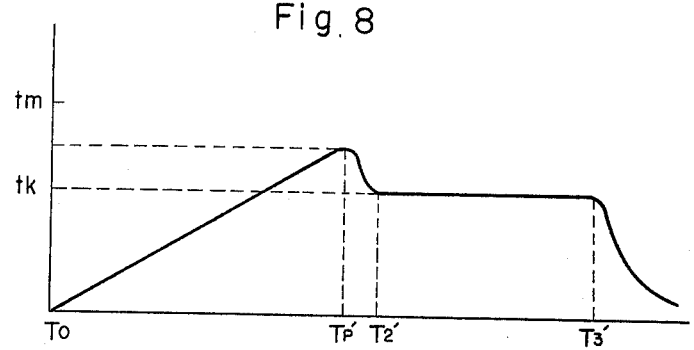
FIG. 8 is a diagram showing a heat pattern involved in the operation of the furnace based on the diagram of FIG. 4 and using a conventional valve of smaller size.

FIG. 6 is a diagram showing a heat pattern involved in the operation of the furnace based on the diagram of FIG. 4 and using a flow rate regulating valve having the port shape described above. FIGS. 7 and 8 are diagrams showing similar heat patterns involved in the operation of the furnace with use of conventional valves.

In the heat pattern diagrams, $t_M$ and $t_K$ represent the temperature reached by heat-up and the temperature given by constant amount of heating. FIG. 7 shows the result obtained by the use of valve of larger size and FIG. 8 shows the result obtained using a valve of smaller size.

These diagrams indicate that the valve having the port shape of FIG. 5 accomplishes ideal heating.

With the valve of the foregoing construction, the rate of variation in the opening area S of the fluid channel 2 relative to the opening degree $x$ of the fluid channel 2 adjusted by the rotation of the valve member 3 can be altered by varying the amount of projection of each of the needles 22 over the valve port 11a. Accordingly the flow rate characteristics of the valve are settable by altering the opening area S by the needles 22 relative to the opening degree of the fluid channel 2.

Figure 9:
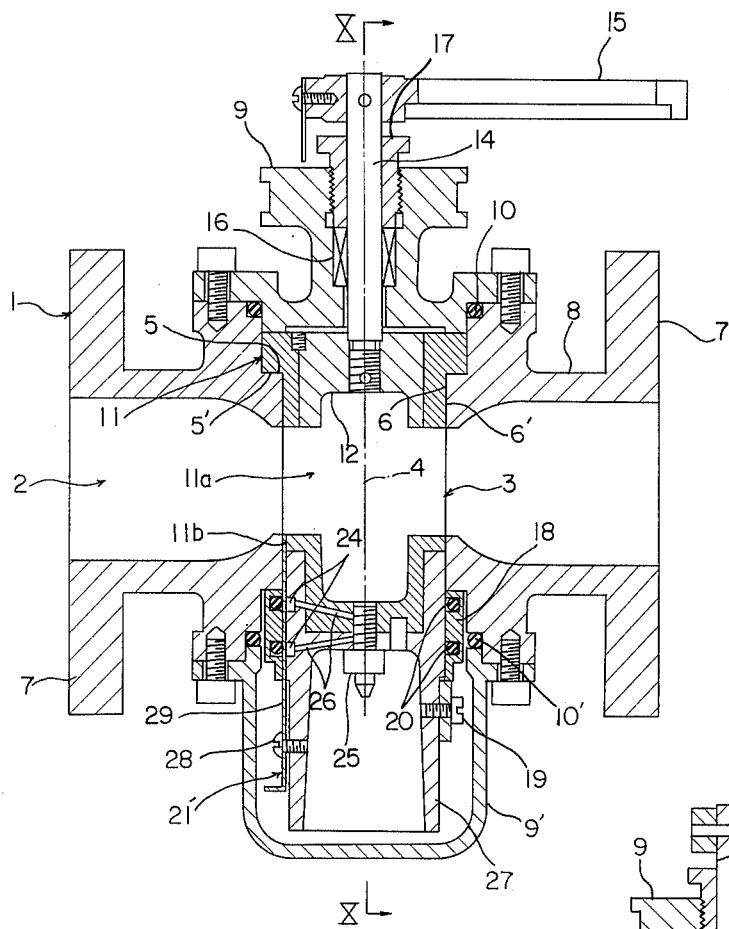
FIG. 9 is a side elevation in vertical section showing another embodiment of the valve.
Figure 10:
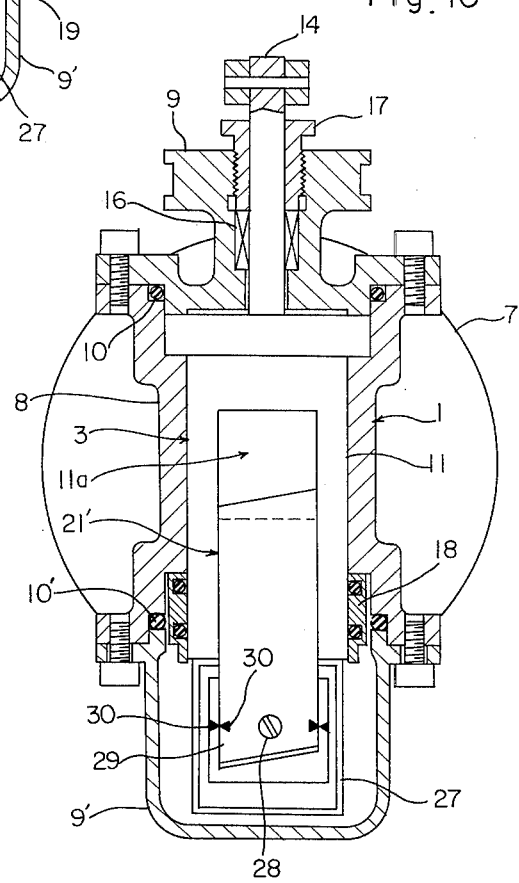
FIG. 10 is a front view in vertical section taken along the line X—X in FIG. 9.

FIGS. 9 and 10 show an improvement over the valve of FIGS. 1 and 2. A plurality of plates 29 are prepared which are fixedly mountable by a screw 28 on a plate rack 27 corresponding to the needle rack 13. The portions of the plates 29 to be projected over the valve port 11a have varying shapes, such that one of the plates 29 is selected and attached to the rack 27 to provide a third member 21'. With the valve of the improved type, change of the plate 29 alters the opening area and shape of the valve port 11a to thereby alter the flow rate characteristics. Each plate 29 has opposite ends of the same shape. The plate 29 and the rack 27 are provided with positioning marks 30 and 30 so as to render the plate mountable in position. Except for these features, the valve has the same construction as one shown in FIGS. 1 and 2. Like parts are referred to by like reference numerals to omit the description thereof.

The valve of this invention may be further provided with an auxiliary rack which is adapted to be fixed and also to be moved along the axis 4 relative to the needle rack 13 to render all the needles 22 movable together by moving the auxiliary rack.

Although the valve member 3 included in the embodiments described are of the rotary type, this invention is applicable also to valves including a slidable valve member.

Further according to this invention, the third member can be installed on the valve casing 1.

What is claimed is:

1. In a flow rate regulating valve including a valve casing disposed substantially at right angles to a fluid channel, a rotatable valve member movably fitted in the valve casing and a manipulator for moving the movable valve member from outside the valve casing, a plurality of slidably adjustable flow control members affixed to said rotatable valve member and indicator means in proximity to said adjustable flow control member serving to define the configuration of the opening in said movable valve member when said manipulator is rotated.

2. A flow rate regulating valve as defined in claim 1 wherein the flow control members are attached to the outer peripheral surface of the rotatable valve member and rotatable therewith when adjusting the degree of opening of the flow channel.

3. A flow rate regulating valve as defined in claim 2 wherein the flow control members comprise a plurality of needle-like members arranged in intimate contact with each other in the direction of rotation of the rotatable valve member, and the needle-like members are individually movable in a direction of axis of rotation of the rotatable valve member.

4. A flow rate regulating valve as defined in claim 3 wherein the rotatable valve member is formed with a circular arc oil seal space in an outer peripheral portion thereof opposed to the group of needle-like members, and the oil seal space is provided with a nipple for supplying grease.

5. A flow rate regulating valve as defined in claim 3 wherein all the needle-like members have the same length and the free ends thereof indicate the opening area of the flow channel determined by the needle-like members.

* * * * *